(12) United States Patent
Lee et al.

(10) Patent No.: US 6,893,311 B2
(45) Date of Patent: May 17, 2005

(54) LCD BONDING MACHINE AND METHOD FOR FABRICATING LCD BY USING THE SAME

(75) Inventors: Sang Seok Lee, Taegu-kwangyokshi (KR); Sang Ho Park, Pusan-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 214 days.

(21) Appl. No.: 10/329,416

(22) Filed: Dec. 27, 2002

(65) Prior Publication Data

US 2003/0181124 A1 Sep. 25, 2003

(30) Foreign Application Priority Data

Mar. 25, 2002 (KR) ........................................ 2002-15975

(51) Int. Cl.$^7$ ................................................. H01J 9/00
(52) U.S. Cl. ............................. 445/24; 349/189; 156/1
(58) Field of Search ........................ 445/24, 25; 156/1, 156/60, 275.3, 275.5; 428/343, 345

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,678 A | 9/1999 | Ashida |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |

(Continued)

FOREIGN PATENT DOCUMENTS

| | | |
|---|---|---|
| EP | 1 003 066 A1 | 5/2000 |
| EP | 1003066 | 5/2000 |
| JP | 51065656 | 6/1976 |

(Continued)

Primary Examiner—Joseph Williams
(74) Attorney, Agent, or Firm—McKenna Long & Aldridge LLP

(57) ABSTRACT

A bonding machine for fabrication of a large size LCD having an upper stage and a lower stage provided in a bonding chamber to face each other, for adsorbing the first and second substrates carried in the bonding chamber, and bonding the substrates together. The bonding machine having supporting means in the bonding chamber, lifting means, and process supplementing means fitted in the bonding chamber so as to be rotatable and movable up/down. The method including loading the first and second substrates on respective stages, driving the supporting means to support the second substrate loaded on the upper stage, and evacuating the bonding chamber, the upper stage adsorbing the second substrate and bonding the first and second substrates together, and lifting the bonded first and second substrates from the lower stage by using the lifting means, and unloading the first and second substrates.

16 Claims, 19 Drawing Sheets

U.S. PATENT DOCUMENTS

| | | |
|---|---|---|
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | Von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 2001/0002100 A1 | 5/2001 | Compton et al. |

FOREIGN PATENT DOCUMENTS

| | | |
|---|---|---|
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 6235925 | 8/1994 |
| JP | 06265915 | 9/1994 |
| JP | 6313870 | 11/1994 |
| JP | 7084268 | 3/1995 |
| JP | 07128674 | 5/1995 |
| JP | 07181507 | 7/1995 |
| JP | 08095066 | 4/1996 |
| JP | 8101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 9061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10177178 | 6/1998 |
| JP | 10221700 | 8/1998 |
| JP | 10282512 | 10/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11248930 | 9/1999 |
| JP | 11326922 | 11/1999 |
| JP | 11344714 | 12/1999 |
| JP | 2000002879 | 1/2000 |
| JP | 2000029035 | 1/2000 |
| JP | 20000056311 | 2/2000 |
| JP | 20000066165 | 3/2000 |
| JP | 2000137235 | 5/2000 |
| JP | 2000193988 | 7/2000 |
| JP | 2000241824 | 9/2000 |
| JP | 2000284295 | 10/2000 |
| JP | 2000292799 | 10/2000 |
| JP | 2000310759 | 11/2000 |
| JP | 2000310784 | 11/2000 |
| JP | 2000338501 | 12/2000 |
| JP | 2001005401 | 1/2001 |
| JP | 2001005405 | 1/2001 |
| JP | 2001013506 | 1/2001 |
| JP | 2001033793 | 2/2001 |
| JP | 2001042341 | 2/2001 |
| JP | 2001051284 | 2/2001 |
| JP | 2001066615 | 3/2001 |
| JP | 2001091727 | 4/2001 |
| JP | 2001117105 | 4/2001 |
| JP | 2001117109 | 4/2001 |
| JP | 2001133745 | 5/2001 |
| JP | 2001133794 | 5/2001 |
| JP | 2001133799 | 5/2001 |
| JP | 2001142074 | 5/2001 |
| JP | 2001147437 | 5/2001 |
| JP | 2001154211 | 6/2001 |
| JP | 2001166272 | 6/2001 |
| JP | 2001166310 | 6/2001 |
| JP | 2001183683 | 7/2001 |
| JP | 2001209052 | 8/2001 |
| JP | 2001209060 | 8/2001 |
| JP | 2001222017 | 8/2001 |
| JP | 2001235758 | 8/2001 |
| JP | 2001021000 | 9/2001 |
| JP | 2001255542 | 9/2001 |
| JP | 2001264782 | 9/2001 |
| JP | 2001026347 | 10/2001 |
| JP | 2001026348 | 10/2001 |
| JP | 2001272640 | 10/2001 |
| JP | 2001281675 | 10/2001 |
| JP | 2001282126 | 10/2001 |
| JP | 2001305563 | 10/2001 |
| JP | 2001330837 | 11/2001 |
| JP | 2001330840 | 11/2001 |
| JP | 2001356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KP | 20000035302 | 6/2000 |

LCD BONDING MACHINE AND METHOD FOR FABRICATING LCD BY USING THE SAME

This application claims the benefit of Korean Application No. P2002-0015975 filed on Mar. 25, 2002, which is hereby incorporated by reference for all purposes as if fully set forth herein.

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a method for fabricating a liquid crystal display, and, more particularly, to a bonding machine for fabrication of a large size liquid crystal display (LCD), and a method for fabricating an LCD by using the same.

2. Discussion of the Related Art

Keeping pace with development of an information-oriented society, demands on displays increase gradually in a variety of forms and, recently, to meet the demands, different flat display panels, such as Liquid Crystal Display (LCD), Plasma Display Panel (PDP), Electro Luminescent Display (ELD), Vacuum Fluorescent Display (VFD), and the like, have been under development, some of which are employed as displays in various apparatuses.

The LCDs have been most widely used the as mobile displays, while replacing the Cathode Ray Tube (CRT), owing to features and advantages of excellent picture quality, lightweight, thin size, and low power consumption. Besides the mobile-type LCDs of the notebook computer monitors, the LCDs are under development for televisions (TVs) for receiving and displaying broadcasting signals, and computer monitors.

Despite the various technical developments in the LCD, for serving as a display in different fields, the studies for enhancing the picture quality of the LCD as a display are inconsistent with the features and advantages of the LCD in many aspects. Therefore, for employing the LCD in various fields as a general display, the key to development of the LCD lies in whether the LCD can implement a high-quality picture such as high definition, high luminance, and a large sized screen, while having a lightweight, thin size, and a low power consumption.

The LCD may be fabricated by a generally known LCD injection method, in which one substrate having sealant patterned thereon to form an injection hole is bonded to the other substrate under a vacuum, and liquid crystal is injected therein through the injection hole, or by a liquid crystal dropping method, as disclosed in Japanese Patent Laid Open Publication Nos. 2000-284295, and 2001-005405, in which one substrate having liquid crystal dropped thereon and the other substrate are provided, and the two substrates, placed oppositely in a vertical direction, are brought closer to bond the two substrates.

Of the two methods, the liquid crystal dropping method is advantageous in that different components can be dispensed with the omission of many steps (such as the step of formation of the liquid crystal injection hole, the step of injection of liquid crystal, and the step of sealing the liquid crystal injection hole). Accordingly, studies have been recently made for development of various apparatuses for use in the liquid crystal dropping method.

FIGS. 1A and 1B illustrate related art bonding machines having the liquid crystal dropping method applied thereto. FIG. 2 illustrates a perspective view of key parts showing operation of substrate supporting means in a related art bonding machine, schematically.

The related art substrate assembler (bonding machine) is provided with a frame 10 forming an outer shape, stage parts 21 and 22, a sealant outlet part (not shown), a liquid crystal dropping part 30, chamber parts 31 and 32, chamber moving means, catch stop means, and stage moving means.

The stage parts have an upper stage 21 and a lower stage 22, and the upper stage 21 is provided with an electro-static chuck 28 for adsorbing the substrate by electrostatic adsorption. The sealant outlet part and the liquid crystal dropping part 30 are fitted to a side of a location at which the frame is bonded, and the chamber part has an upper chamber unit 31 and a lower chamber unit 32, detachable from each other, wherein the upper chamber unit 31 has a vacuum valve 23, and a hose 24 for evacuation of the chamber part connected thereto, and a gas purge valve 70 and a gas tube 71 for placing the chamber part into an atmospheric state.

The chamber moving means has a driving motor 40 for selective transfer of the lower chamber unit 32 to a location where the bonding is made, or to a location where discharge of the sealant and dropping of the liquid crystal is made. The stage moving means has a driving motor 50 for selective upward/downward movement of the upper stage 21.

The catch stop means supports the substrate 52 held at the upper stage 21 at diagonal positions of the substrate 52 during evacuation of the chamber, temporarily. The catch stop means is provided with rotating shafts 61, rotation actuators 63, elevation actuators 64, and supporting plates 62.

The steps of a process for fabricating an LCD by using a related art substrate assembler (bonding machine) will be explained in detail.

The upper stage 21 has one of the substrates (hereafter called as a "second substrate" 52) loaded thereon fixed thereto, and the lower stage 22 has the other one of the substrates (hereafter called as a "first substrate" 51) loaded thereon and fixed thereto.

Referring to FIG. 1A, in this state, the lower chamber unit 32 having the lower stage 22 is moved to a location for sealant coating and liquid crystal dropping by the chamber moving means 40.

Referring to FIG. 1B, when the sealant coating and the liquid crystal dropping are finished by the sealant outlet part and the liquid crystal dropping part 30, the lower chamber unit 32 is moved to a location for bonding the substrates by the chamber moving means 40. Then, the chamber units 31 and 32 are assembled by the chamber moving means 40, such that spaces the stages 21 and 22 are located therein are sealed, and the elevating actuators 64 and the rotating actuators 63 in the catch stop means are driven to bring the supporting plates 62 to two corners of the second substrate 52 held at the upper stage 31.

In this state, referring to FIG. 2, the adsorption force that holds the second substrate 52 is released, to drop the second substrate 52 onto the supporting plates 62 of the catch stop means.

Along with this, the chamber part is evacuated by using the vacuum valve 23 and the hose 34, and, when the chamber is evacuated, a voltage is applied to the electro-static chuck 28 to hold the second substrate 52 by electro-static adsorption, and the rotation actuator 63 and the elevation actuator 64 of the catch stop means are driven, so that the supporting plate 62 and the rotating shafts 61 do not interfere in bonding the two substrates together.

Then, in this vacuum state, as the upper stage 21 is moved downward by the state moving means 50, the second substrate 52 held at the upper stage 21 is bonded to the first substrate 51 held at the lower stage 22.

Upon completion of the bonding of the two substrates by means of the upper and lower stages 21 and 22, the gas purge valve 80 is opened, to return the chamber part into an atmospheric state.

Then, finished substrates are unloaded, and carried to a subsequent process, and, at the same time, new substrates are carried in, to continuously carry out substrate bonding.

However, the related art method for fabricating LCD having the liquid crystal dropping method applied thereto has the following problems.

First, when the chamber part is at a vacuum, because, though the upper stage adsorbs the second substrate by means of the electro-static chuck, the lower stage does not adsorb the first substrate, the first substrate on the lower stage is likely to be involved in position change in evacuation of the chamber part, which leads to misalignment of the two substrates to be bonded.

Second, the bonded substrate are likely to be involved in distortion, which leads to a defective bonding of the substrates, due to sudden pressure change during releasing the vacuum of the chamber part upon completion of the substrate bonding. This is because there has been no system for fixing the bonded substrates since the chamber part is placed in an atmospheric state after the upper stage is moved upward upon finishing the substrate bonding.

Of course, by generating the electro-static force at the lower stage to hold bottom of the bonded substrates, there is still a problem of distortion of the first substrate with respect to the second substrate in an upper part of the bonded substrates because the lower stage only holds the first substrate in a lower part of the bonded substrates.

Third, a plurality of fingers in the related art robot arm of the carrying device for carrying out loading of the substrate smoothly droop as the fingers have a small width compared to a length. Particularly, the substantially greater droop of fore ends of the fingers (i.e., opposite parts of a part connected to the carrying device) leads the substrate to droop also, which causes damage to different parts of the substrate.

Fourth, the unloading of substrates from the chamber part after loading of substrates to be bonded into the chamber part by means of the lower chamber unit 22 limits the reduction of a substrate loading/unloading time period.

SUMMARY OF THE INVENTION

Accordingly, the present invention is directed to a method for fabricating an LCD that substantially obviates one or more of the problems due to limitations and disadvantages of the related art.

An advantage of the present invention is to provide a method for fabricating an LCD which can prevent defective loading or bonding of substrate that may be caused in substrate bonding in advance, and can reduce a fabrication time period.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the bonding machine includes a bonding chamber for bonding first and second substrates together; an upper stage and a lower stage provided in the bonding chamber to face each other, for adsorbing the first and second substrates carried in the bonding chamber, and bonding the substrates together; supporting means in the bonding chamber for receiving the second substrate; lifting means for lifting the substrate when the first substrate is loaded on the lower stage, and the bonded first and second substrates when the first and second substrates are unloaded from the lower stage; and process supplementing means fitted in the bonding chamber so as to be rotatable and movable upward/downward, for holding the bonded substrates, or supporting the substrate to be held at the upper stage.

In another aspect of the present invention, there is provided a method for fabricating an LCD by using a bonding machine having an upper stage and a lower stage provided in a bonding chamber to face each other, for adsorbing the first and second substrates carried in the bonding chamber, and bonding the substrates together; supporting means in the bonding chamber for receiving the second substrate; lifting means for lifting the substrate when the first substrate is loaded on the lower stage, and the bonded first and second substrates when the first and second substrates are unloaded from the lower stage; and process supplementing means fitted in the bonding chamber so as to be rotatable and movable upward/downward, for holding the bonded substrates, or supporting the substrate to be held at the upper stage, the method including loading the first and second substrates on respective stages; driving the supporting means to support the second substrate loaded on the upper stage; and evacuating the bonding chamber, the upper stage adsorbing the second substrate and bonding the first and second substrates together, and lifting the bonded first and second substrates from the lower stage by using the lifting means; and unloading the first and second substrates.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1A:
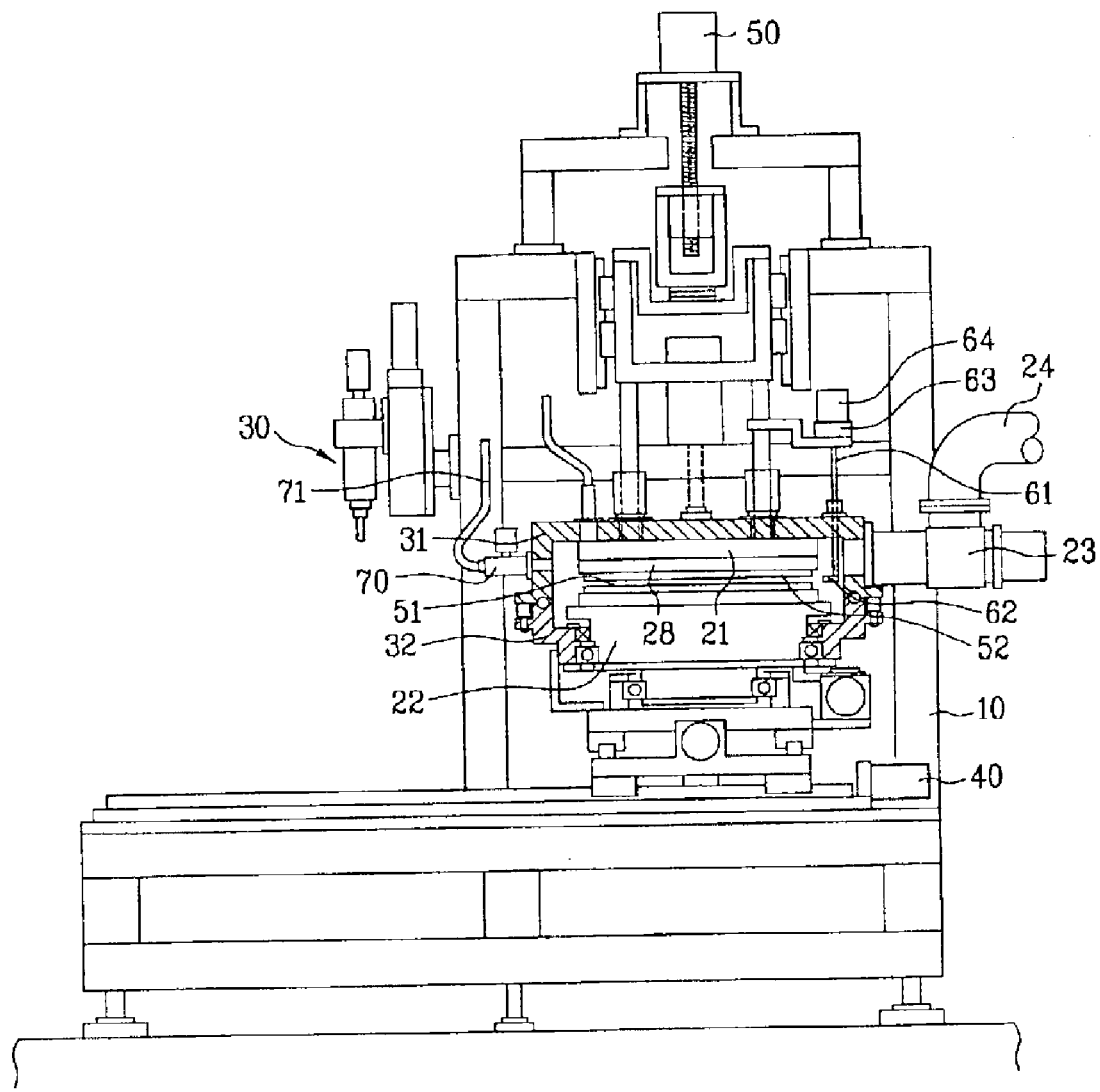
FIGS. 1A–1B illustrate related art LCD bonding machines having the liquid crystal dropping method applied thereto shown schematically.
Figure 1B:
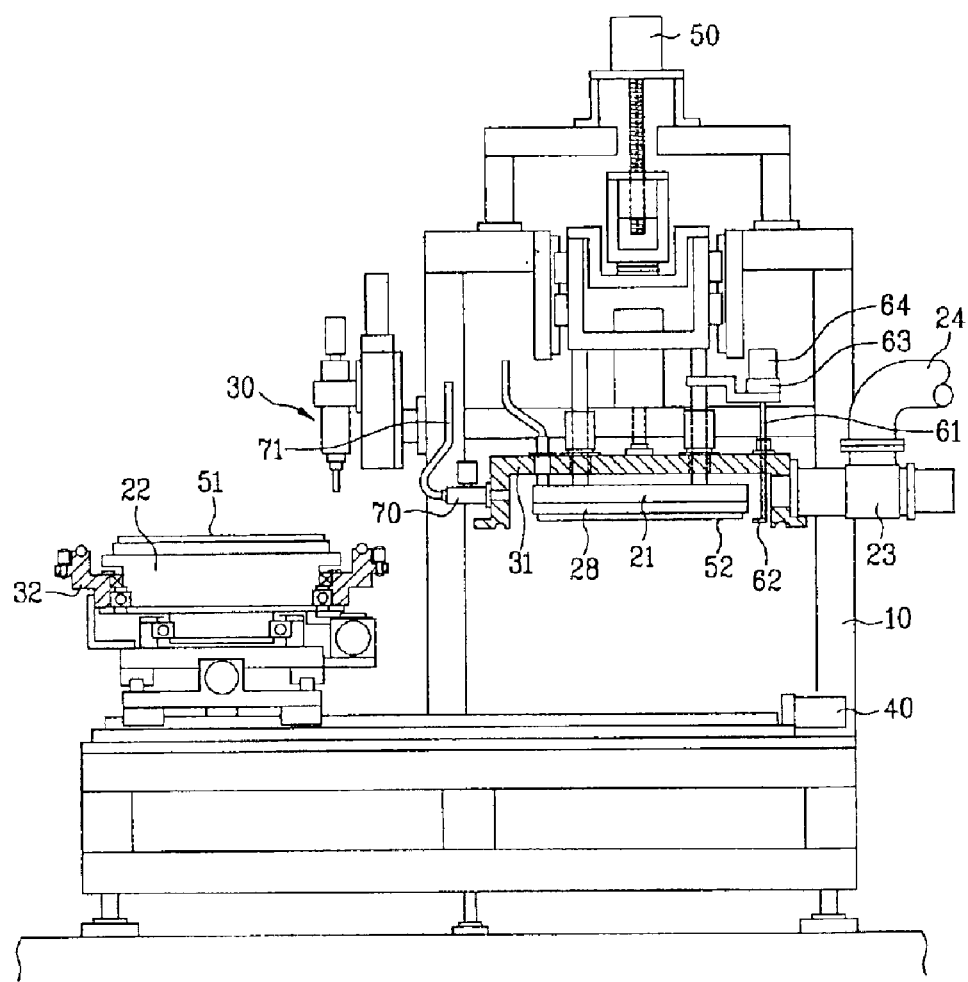
Figure 2:
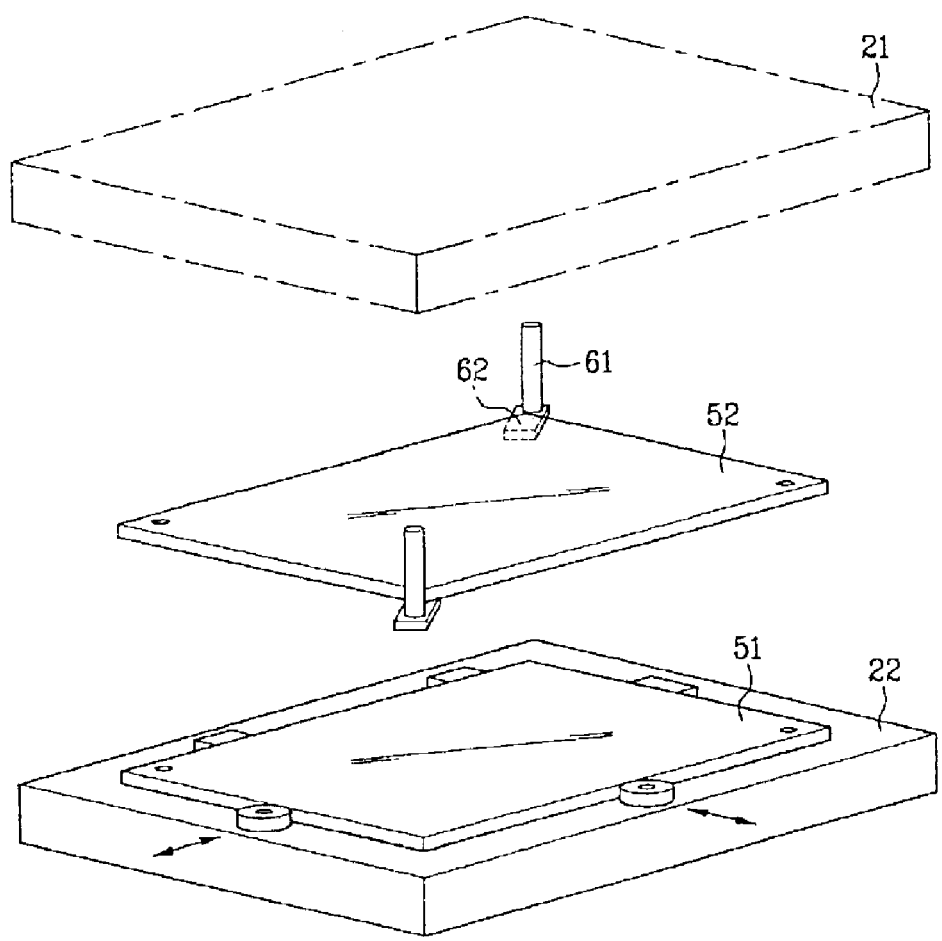
FIG. 2 illustrates a perspective view of key parts showing operation of substrate supporting means in a related art bonding machine, schematically.
Figure 3:
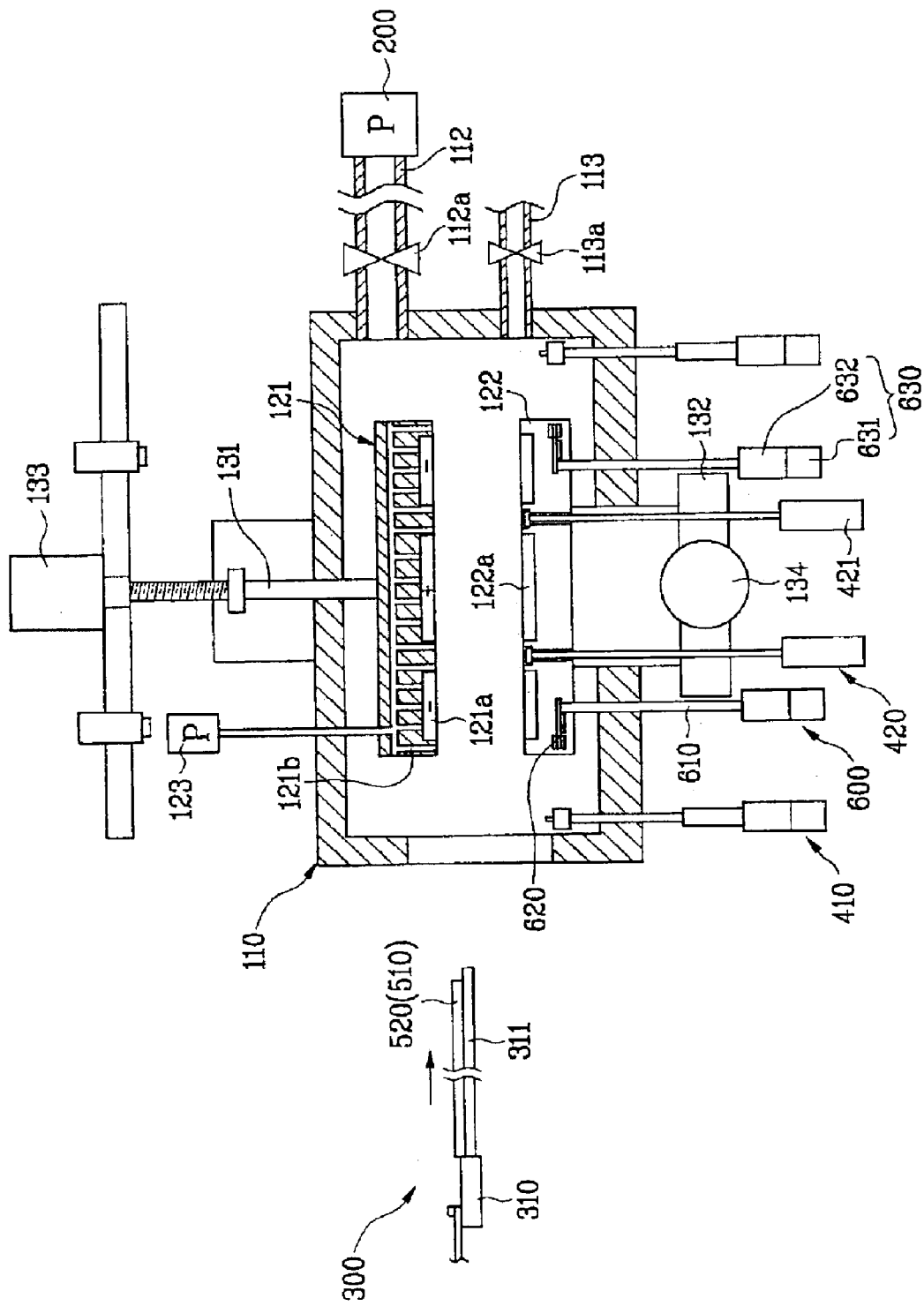
FIG. 3 illustrates a perspective view of system showing an inside stage of a vacuum bonding machine having a process supplementing means in accordance with an embodiment of the present invention applied thereto, schematically.
Figure 4:
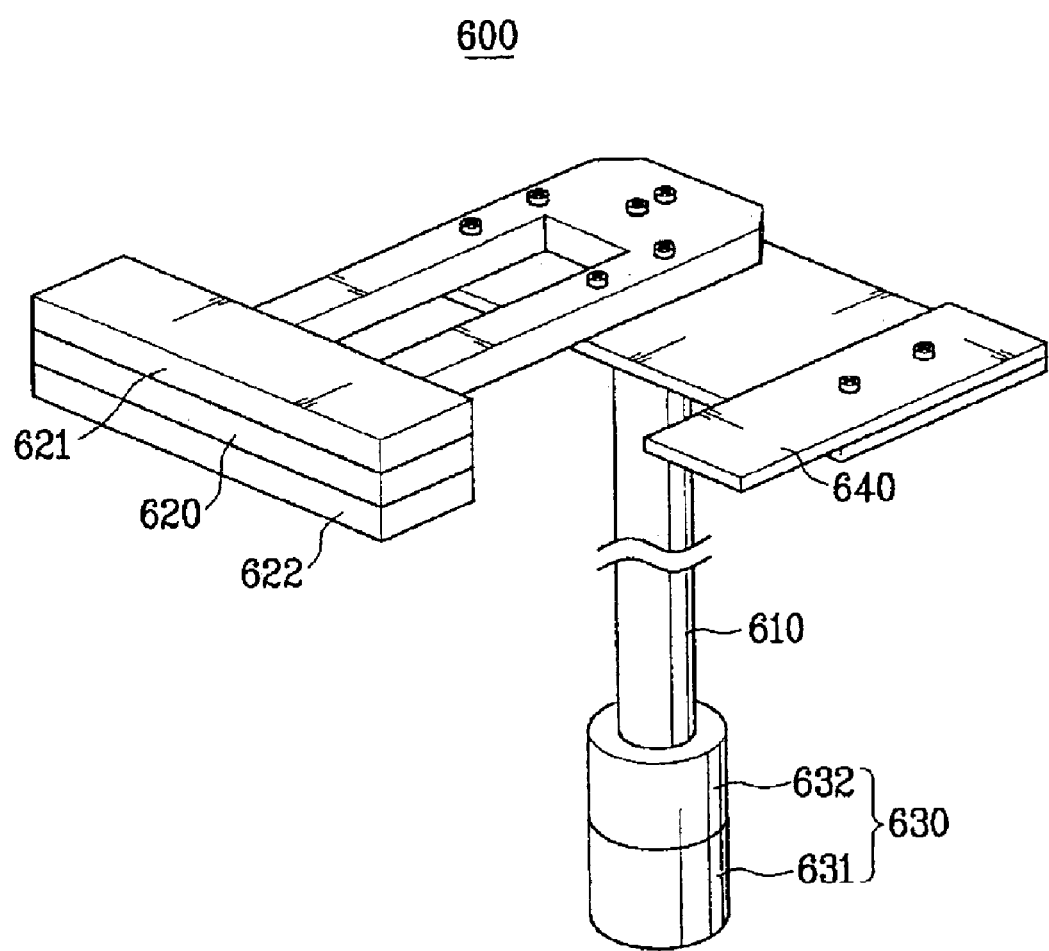
FIG. 4 illustrates a perspective view of a process supplementing means in accordance with an embodiment of the present invention.
Figure 5:
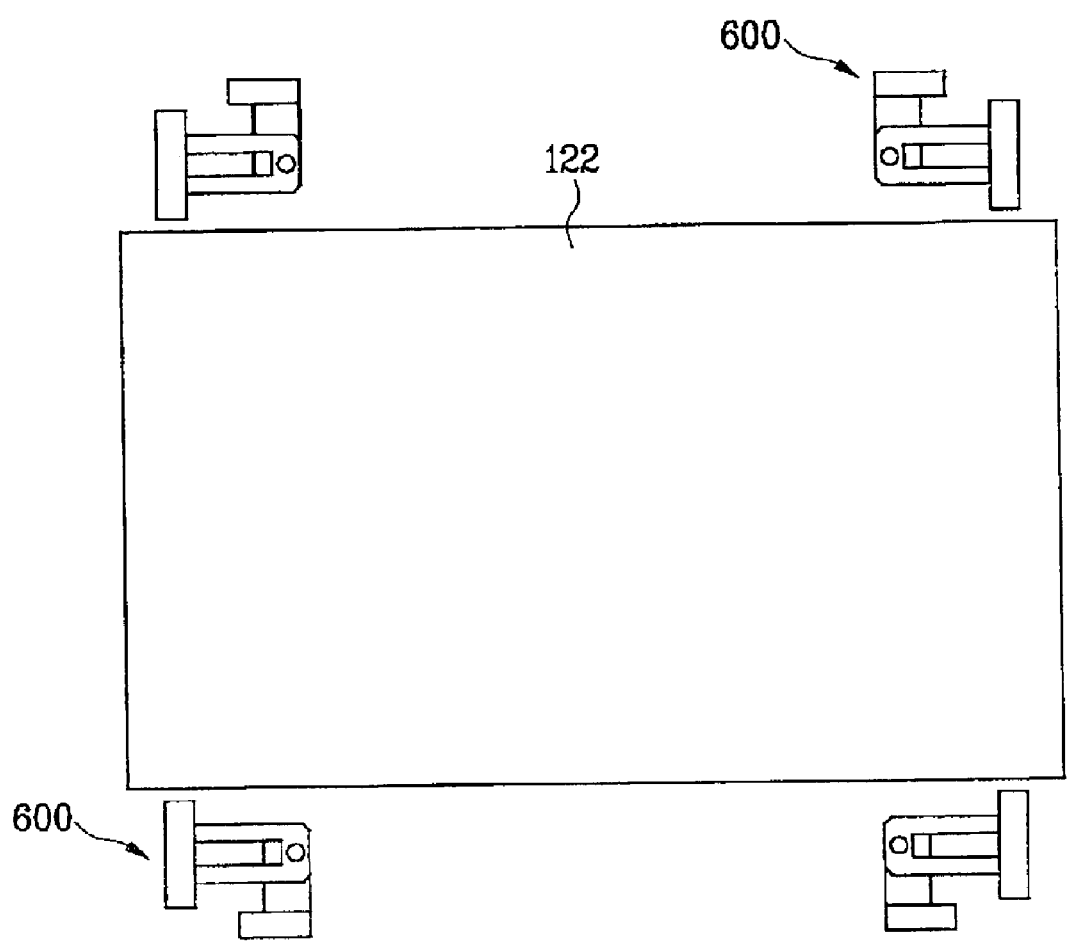
FIG. 5 illustrates a plan view of a fitted state of the process supplementing means in accordance with an embodiment of the present invention.
Figure 6:
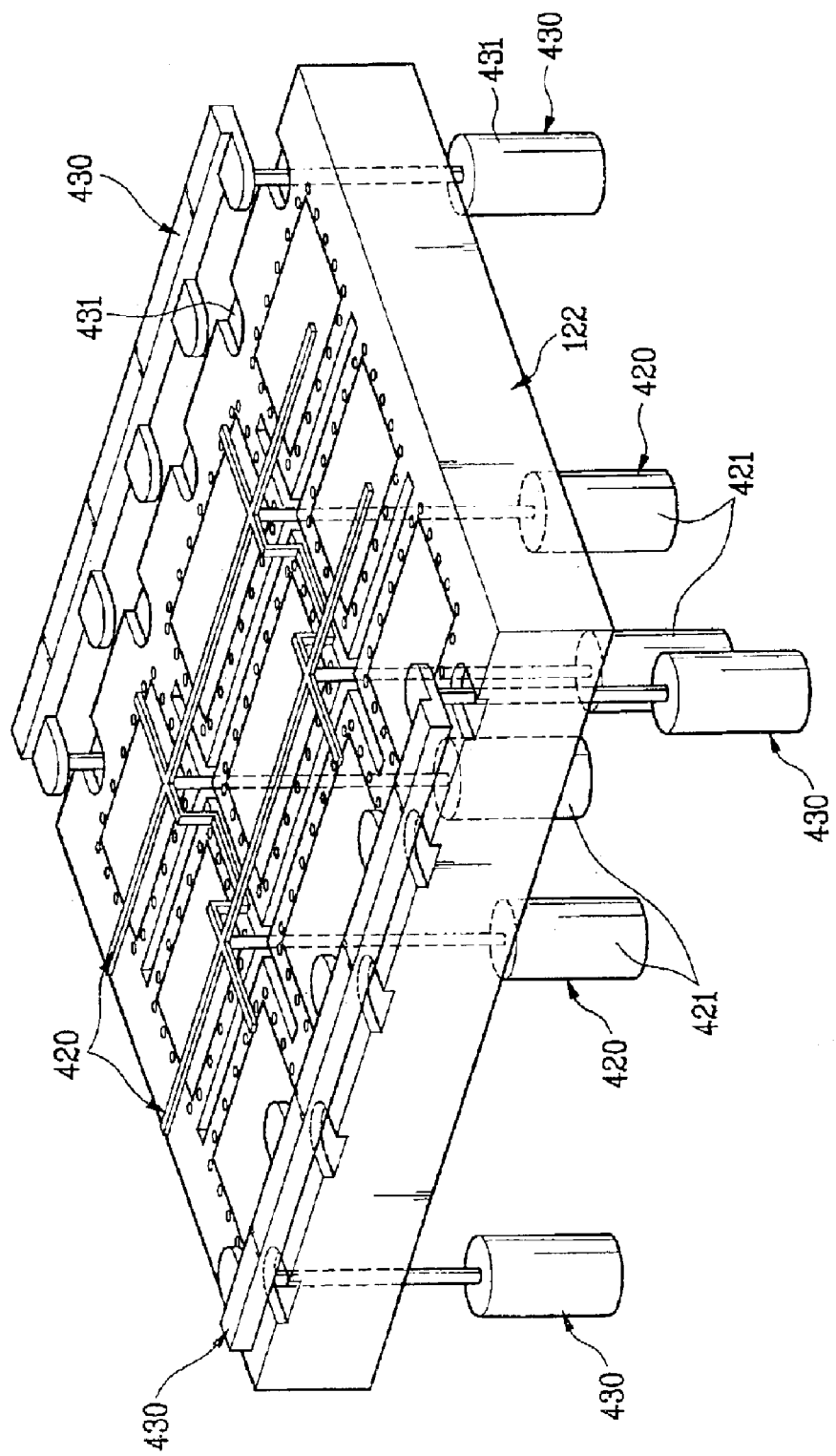
FIG. 6 illustrates a perspective view of firs, and second lifting means in accordance with an embodiment of the present invention.

FIG. 3 illustrates a perspective view of system showing an inside stage of a vacuum bonding machine having a process supplementing means in accordance with an embodiment of the present invention applied thereto schematically. FIG. 4 illustrates a perspective view of a process supplementing means in accordance with an embodiment of the present invention. FIG. 5 illustrates a plan view of a fitted state of the process supplementing means in accordance with an embodiment of the present invention. FIG. 6 illustrates a perspective view of first and second lifting means in accordance with an embodiment of the present invention.

The vacuum bonding machine of the present invention includes a vacuum chamber 110, an upper stage 121 and a lower stage 122, a stage moving device, a vacuum device 200, and process supplementing means.

The vacuum chamber 100 is evacuated selectively into a vacuum state, or an atmospheric state, for bonding the substrates together. The vacuum chamber 110 has an air extraction tube 112 at one side of thereof for receiving an air suction force from the vacuum device 200, and extracting air therefrom, and a vent tube 113 at the one side thereof for introducing external air or gas thereto for maintaining the vacuum chamber 110 at an atmospheric pressure, thereby placing the vacuum chamber 100 at a vacuum or at a vacuum released state. The air extraction tube 112 and the vent tube 113 have electronically controlled valves 112a and 113a for selective opening/closing respective tube lines.

The upper stage 121 and the lower stage 122 are arranged in an upper space and a lower space of the vacuum chamber 110 oppositely, for vacuum, or electrostatic adsorption of respective substrates 510 and 520 carried into the vacuum chamber 110, and making selective movement to hold the substrates 510 and 520 at required working positions in the chamber 110, and bonding the substrates 510 and 520 together. The carrying device 300 controls the robot arms 310 and 320? having a plurality of finger parts 311 for carrying the substrate in/out of the vacuum chamber 110.

The upper stage 121 includes at least one or more electro-static chucks (ESC) 121a at a bottom thereof for providing a plurality of electro-static forces to hold the substrate (hereafter called as a "second substrate") 520, and a plurality of vacuum holes 121b for receiving a vacuum adsorption force from a vacuum pump 123 to hold the second substrate 520.

Along with this, there are supporting means 410 at corner part of the vacuum chamber for temporary supporting of the second substrate 520 during evacuation of the vacuum chamber 110.

However, it is not required that the supporting means 410 has necessarily above system, may have a variety of systems as far as the system can receive the second substrate 520 temporarily, and, also, may have positions adjacent to the two diagonal corners of the upper stage 121, or diagonal four corners of the stages 121 and 122.

Moreover, like the bottom of the upper stage 121, the lower stage 122 includes at least one or more electro-static chucks 122a at a top thereof, and vacuum holes 122b. In addition, first lifting means 420 fitted thereto to be movable in an upward/downward direction for loading/unloading a substrate (hereafter called as a "first substrate") carried in for being loaded therein, and second lifting means 421 at edges thereof for prevention of drooping of a periphery of the first substrate 510 (see FIG. 6).

The first lifting means 420 is designed to be brought into contact with the bottom of the first substrate 510, and to be operable passed through the lower stage 122, and the second lifting means 421 fitted to be movable in an upward/downward direction while selectively received in a recess part 431? in opposite edges of the top of the lower stage 122 for supporting the first substrate 510 at edges of the first substrate or the bonded substrates in loading the first substrate 510 or unloading the bonded substrates, thereby preventing drooping of the parts. The first and second lifting means 420 and 421 may be operable by hydraulic/pneumatic cylinders, motors, or the like. However, the first and second lifting means 420 and 421 are not necessarily limited to any one form, since the substrate loading/unloading may have a variety of systems.

The stage moving device includes a movable shaft 131 coupled to the upper stage for moving the upper stage 121 upward/downward, a rotating shaft 132 coupled to the lower stage 122 for rotating the lower stage, and driving motors 133 and 134 for moving, or rotating respective shafts coupled to the stages 121 and 122.

The stage moving device is not limited to a system which is simply moving the upper stage 121 upward/downward, or rotating the lower stage to the left or right. That is, the upper stage may have a system which is rotatable left/right, or the lower stage 122 may have a system which is movable upward/downward. In this case, the upper stage 121 has a separate rotating shaft (not shown) additionally provided thereto for the rotation, and the lower stage 122 is provided with a separate movable shaft (not shown) provided thereto additionally for the upward/downward movement.

The vacuum device 200 of the bonding machine of the present invention transmits a suction force so that the vacuum chamber 110 can achieve a vacuum state selectively. In general, the vacuum device 200 has a system of a suction pump operative for generating the air suction force. The space the vacuum device 200 is provided therein is made to be in communication with the air extraction tube 112 of the vacuum chamber 110.

Referring to FIG. 4, the process supplementing means 600 holds the bonded substrate 500 (not shown in FIG. 4) in a process for releasing the vacuum of the vacuum chamber 110, or pushing the second substrate 520 held at the upper stage 121 toward the upper stage 121 when the vacuum chamber 110 is at a vacuum.

The process supplementing means 600 includes a rotating shaft 610, a supporting part 620, and a driving part 630. The rotating shaft 610 is arranged at a position where it can be moved up/down and rotated in the vacuum chamber 110, so that the rotating shaft 610 is selectively rotated by the driving part 630 for placing the supporting part 620 in a periphery of the top of the lower stage 122.

The supporting part 620 is formed as one unit with the rotating shaft 610 at one end thereof, for being brought into contact with a preset part of the second substrate 520, the bonded substrates 500, or the carrying device 300 for supporting the second substrate 520, holding the bonded substrate 500, or supporting an end of the carrying device 300.

Surfaces of the supporting part in contact with the substrates 510 and 520 include a first contact part 621 and a second contact part 622, formed of a material which can prevent scratches when both come into contact, such as Teflon or PEEK®. However, the contact parts 621, and 622 are not necessarily formed additionally, but the surfaces of the supporting part 620 may be coated with Teflon or PEEK®.

The driving part 630 includes a rotating motor 631 fitted to an outside (or inside) of the vacuum chamber 110, and coupled to the rotating shaft 610, for rotating the rotating shaft 610, and a hydraulic/pneumatic elevating cylinder 632 for moving the rotating shaft 610 up/down. The systems for rotating and moving the rotating shaft 610 up/down may not be necessarily include the rotating motor 631 and the elevating cylinder 632, but may include other varieties of devices or apparatuses.

The range that the rotating shaft 610 moves up/down is driven by the elevating cylinder 632 and the operation ranges of the process supplementing means of the present invention. That is, the range of movement up/down of the rotating shaft 610 may be set as an operation range for fixing the bonded substrates 500 in a process for releasing a vacuum of the chamber 110, an operation range for pressing the second substrate 520 held at the upper stage 121 toward the upper stage 121 when the vacuum chamber 110 is at a vacuum, and an operation range for supporting ends of finger parts 311 of the carrying device 300 which carries in the substrate in a case where the carrying device 300 carries in the substrate 510 or 520.

In a case when the driving part 630 is fitted to an outside and under the vacuum chamber 110 as suggested in a drawing of an embodiment of the present invention, the rotating shaft 610 is coupled with, and passed through the vacuum chamber 110, and it is required that the coupled part of the vacuum chamber 110 and the rotating shaft 610 is sealed.

Moreover, referring to FIG. 5, the present invention suggests that the foregoing process supplementing means 600 is located at a part adjacent to a corner part of one side of the lower stage 122 and no second lifting means 421 is formed thereon. However, the process supplementing means 600 is not necessarily limited to the foregoing system, but the process supplementing means 600 may be fitted such that operation of the process supplementing means 600 is made at a position adjacent to a central part of a side of the lower stage 122, or at a position adjacent to a corner and a central part of a side of the lower stage 122.

A method for fabricating an LCD by using the foregoing bonding machine of the present invention will be explained.

FIGS. 7–17 illustrate operation states of a bonding chamber according to a method for fabricating an LCD of the present invention. FIG. 18 illustrates a flow chart showing the steps of a method for fabricating an LCD of the present invention.

The bonding process of the present invention may include loading two substrates in a bonding chamber, evacuating the bonding chamber, aligning the two substrates, bonding the two substrates together, setting and fixing sealant in the same chamber, venting the bonding chamber for applying a pressure to the two substrates, and unloading the bonded substrates from the bonding chamber. The step of setting and fixing sealant in the same chamber may be omitted.

At first, liquid crystal is dropped on a first substrate 510, and sealant is coated on a second substrate 520. One of the first and second substrates 510 and 520 has a plurality of panels designed thereon, each with thin film transistor array, and the other one of the first and second substrates 510 and 520 has a plurality of panels designed thereon in conformity with the panels on the one substrate, each with color filter array having a black matrix layer, a color filter layer, and a common electrode. For convenience of description, the substrate with the thin film transistor is referred to as a first substrate, and the substrate with the color filter array is referred to as a second substrate 520. Of course, either of the first and second substrates may have the liquid crystal dropped thereon, and the sealant coated thereon.

The carrying device 300 controls first and second arms 310 and 320 each having a plurality of finger parts 311 to receive the first substrate 510 to be carried to the lower stage 122, and the second substrate 520 to be carried to the upper stage 121.

Figure 7:
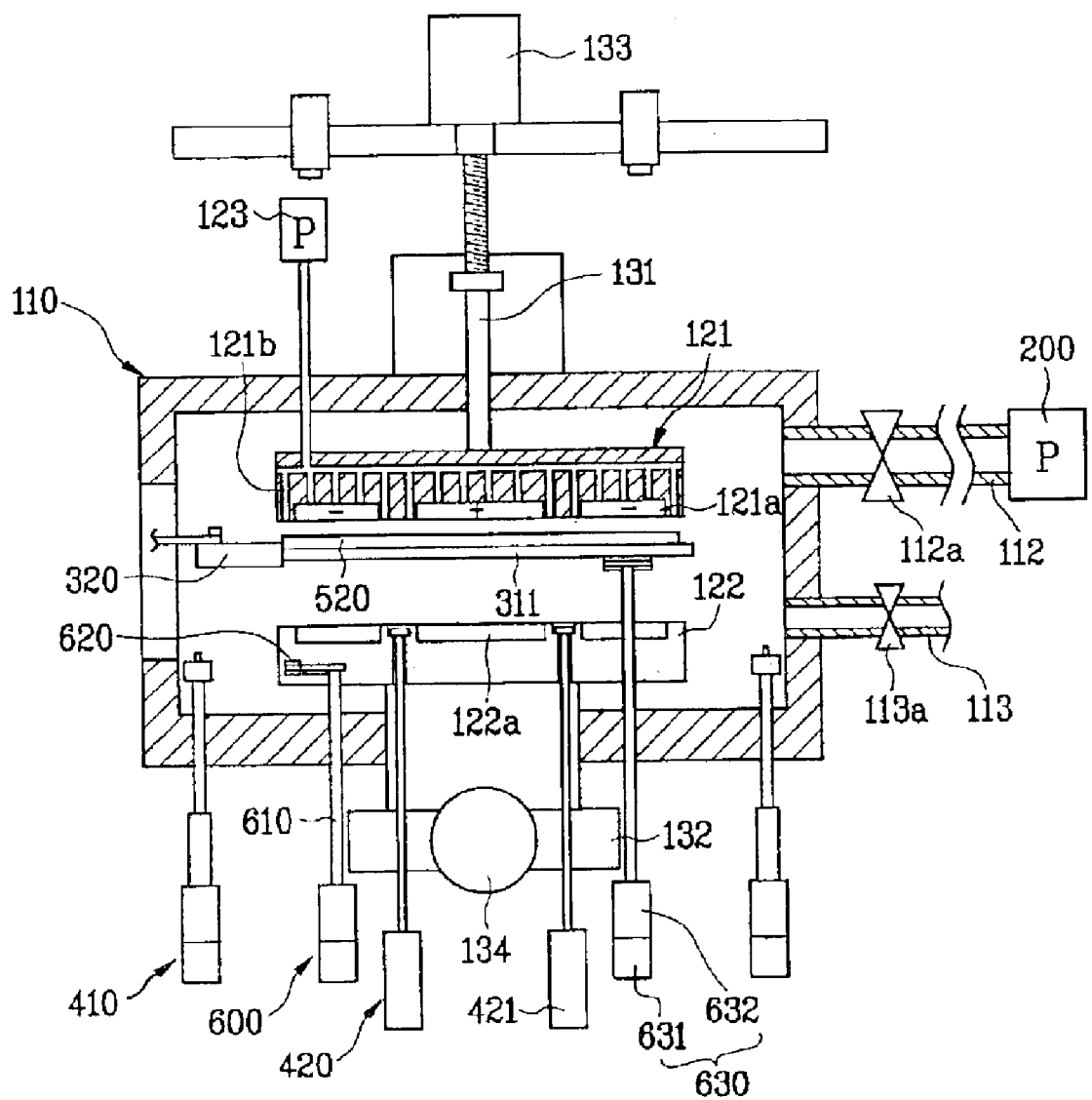
FIG. 7 illustrates a section of a bonding chamber in loading a second substrate according to a method for fabricating an LCD in accordance with an embodiment of the present invention.

Referring to FIG. 7, in this state, the carrying device 300 controls the second arm 320 to carry the second substrate 520 having no liquid crystal dropped thereon through an opening in the bonding chamber 110 into the bonding chamber 110 with a face of the second substrate 520 to be bonded directed downward. In this instance, the elevating cylinder 632 in the driving part 630 of the process supplementing means 600 is driven to move the rotating shaft 610 upward, and the rotating motor 631 is driven to rotate the rotating shaft 610, to bring the supporting part 620 to a working location.

Figure 8:
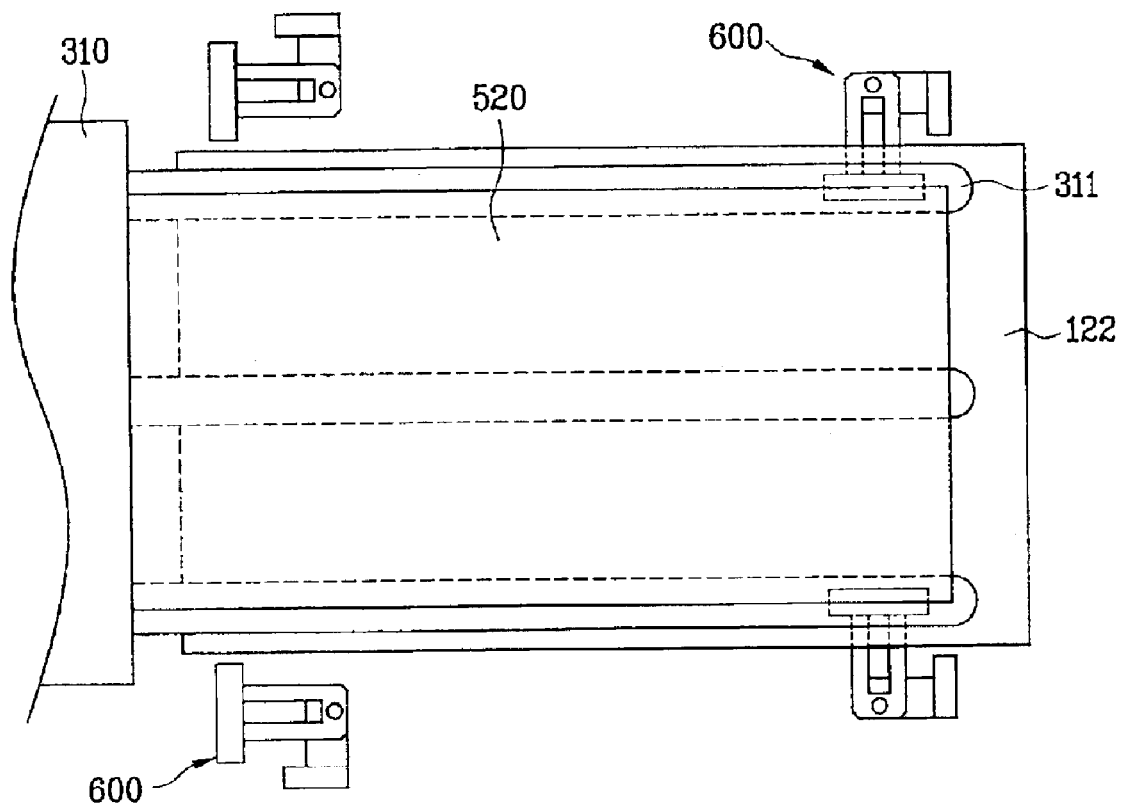
FIG. 8 illustrates a plan view showing an operation state of a carrying device and a process supplementary device in loading a second substrate according to a method for fabricating an LCD in accordance with an embodiment of the present invention, schematically.

In this instance, the rotating shaft 610 is moved upward roughly to a height where ends of the finger parts 311 of the second arm 320 are located, and the supporting parts 620 are located under the ends of the finger parts 311. Accordingly, bottoms of the ends of the finger parts 311 are supported on tops of the supporting parts 620 of the process supplementing means 600, thereby preventing the ends of the finger parts 311 from drooping downward, as shown in FIGS. 7 and 8.

Of course, the foregoing operation steps may be set such that the process supplementing means 600 of the present invention is put into operation so as to come to a required position before the second substrate 520 is carried and the carrying device 300 carries the second substrate 520.

Then, in a state the finger parts 311 are supported on the supporting parts 620 of the process supplementing means 600, loading of the second substrate 520 is finished by moving the upper stage 121 downward close to the second substrate 520. The second substrate 520 is adsorbed to the upper stage 121 as the vacuum pump 123 comes into operation, to transmit a vacuum adsorption force through the vacuum holes 121b in the upper stage 121 to the second substrate 520, and moving the upper stage 121 upward. Then, the process supplementing means 600 is returned to an initial position.

If the bonded substrates are on the lower stage 122 since bonding is done just before the loading of the second substrate 520, the second arm 320 carried in the second substrate 520 unloads the bonded substrates on the lower stage 122. This process will be explained later.

In succession, the first arm 310 of the carrying device 300 carries the first substrate 510 to be loaded on the lower stage 122 through an opening 101 in the vacuum chamber 110. At the same time, the elevating cylinders 632 of the driving parts 630 in the process supplementing means 600 are driven to move the rotating shaft 610 upward, and the rotating motor 631 is driven to rotate the rotating shaft 610.

Figure 9:
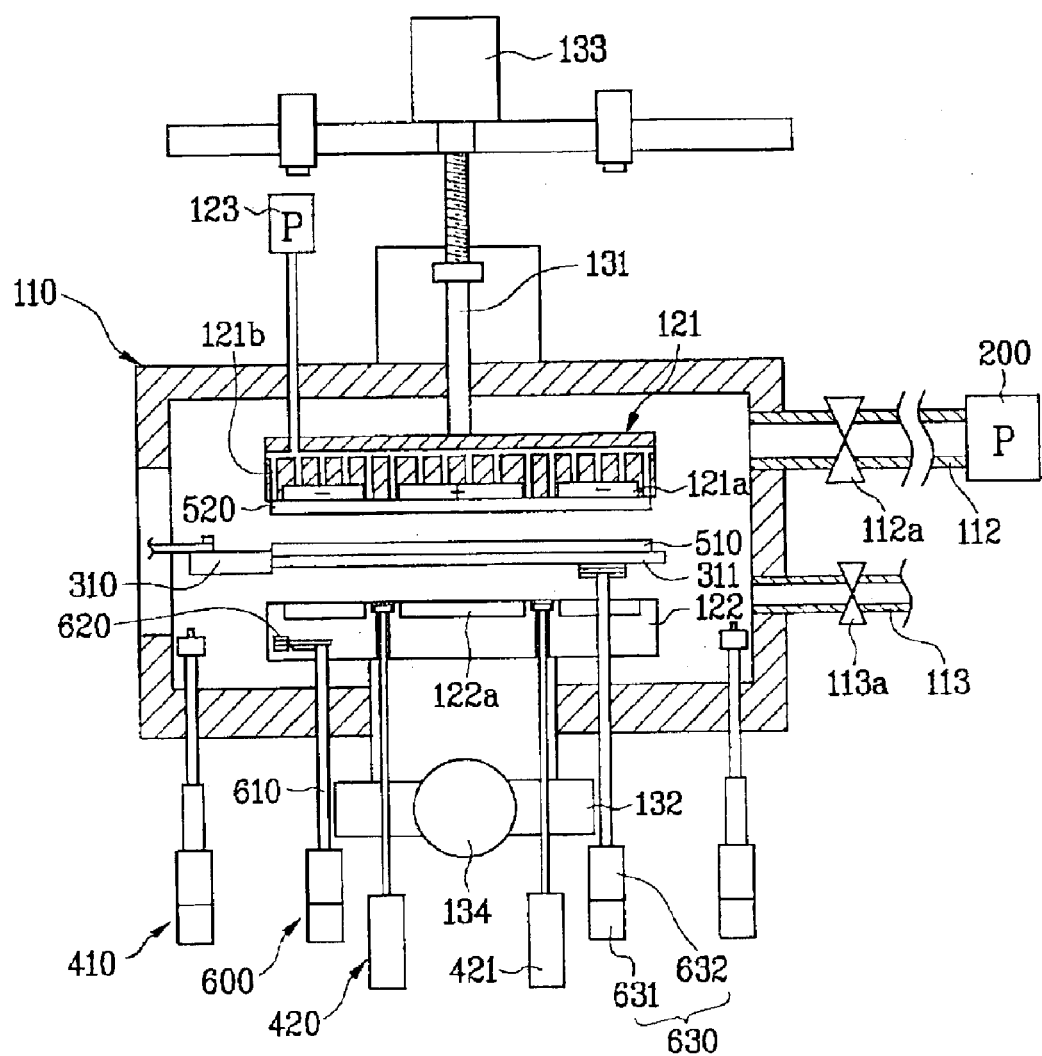
FIGS. 9–11 illustrate systems each showing an operation state of a bonding chamber in loading a first substrate according to a method for fabricating an LCD in accordance with an embodiment of the present invention, schematically.

In this instance, the rotating shaft 610 is moved upward roughly to a height where the ends of the finger parts 311 of the first arm 310 are located, and the supporting parts 620, rotated as the rotating motor 631 is driven, are brought to a location under the ends of the finger parts 311. Eventually, bottoms of the ends of the finger parts 311 are supported on the supporting parts 620 of the process supplementing means 600, to prevent the ends of the finger parts 311 from drooping. This state is shown in FIG. 9.

Figure 10:
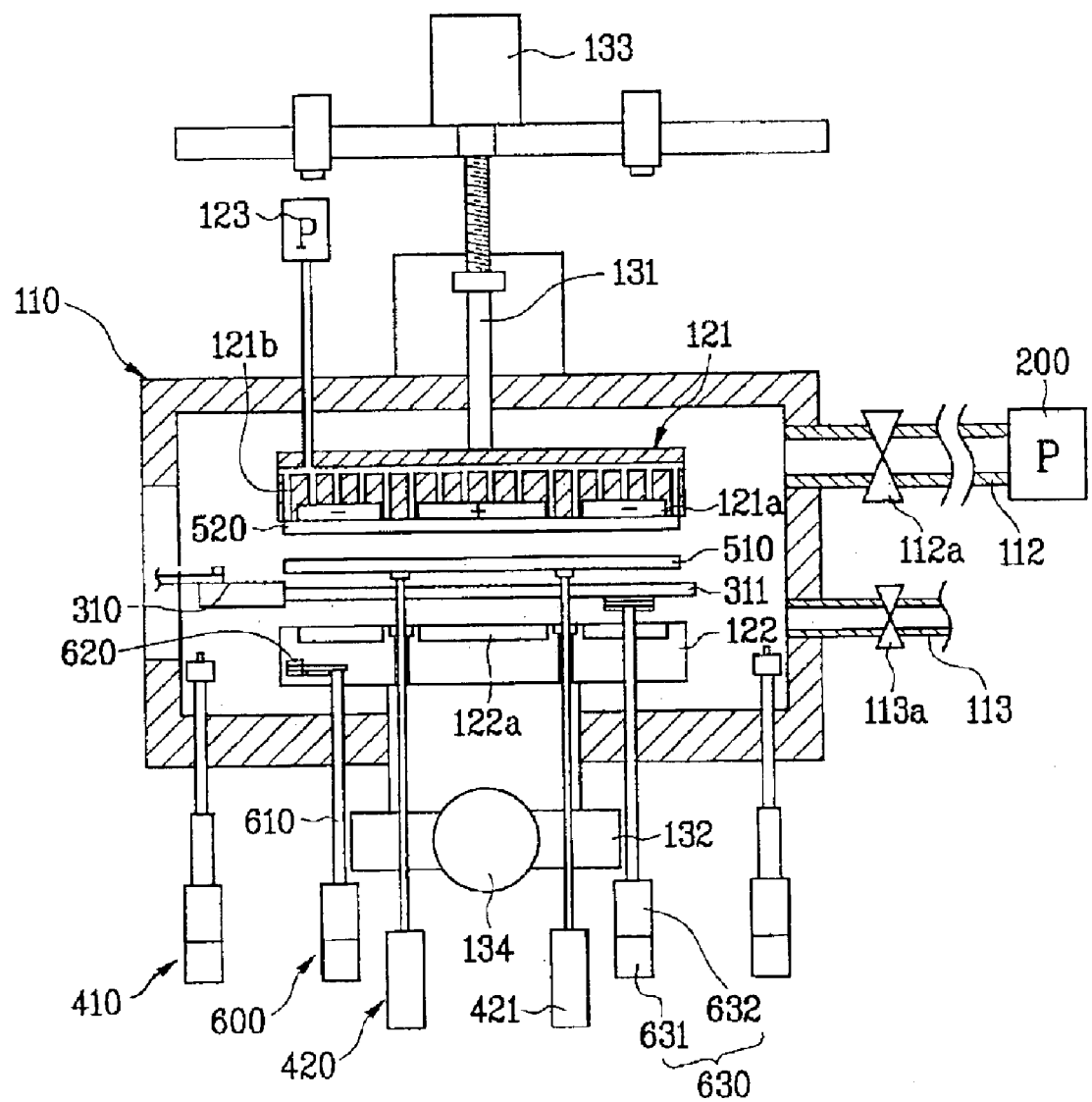

In the state the finger parts 311 are supported on the supporting parts 620 of the process supplementing means 600, the first and second lifting means 420 and 421 in the groove 122a and in the recess part 431 (not shown in FIG. 10) of the lower stage 122 are moved upward, to lift the first substrate 510 carried in by the carrying device 300. This state is shown in FIG. 10.

Then, the finger parts 311 of the first arm 310 in the carrying device 300 are brought out, and the supporting parts 620 of the process supplementing means 600 return to original positions as the rotating motors 631 and the elevating cylinders 632 are driven.

Upon completion of the foregoing process, the first substrate 510 is supported on the first and second lifting means 420 and 421, and the first and second lifting means 420 and 421 are moved down until the first and second lifting means 420 and 421 rest in the groove 122a and the recess part 431 in the lower stage 122.

Figure 11:
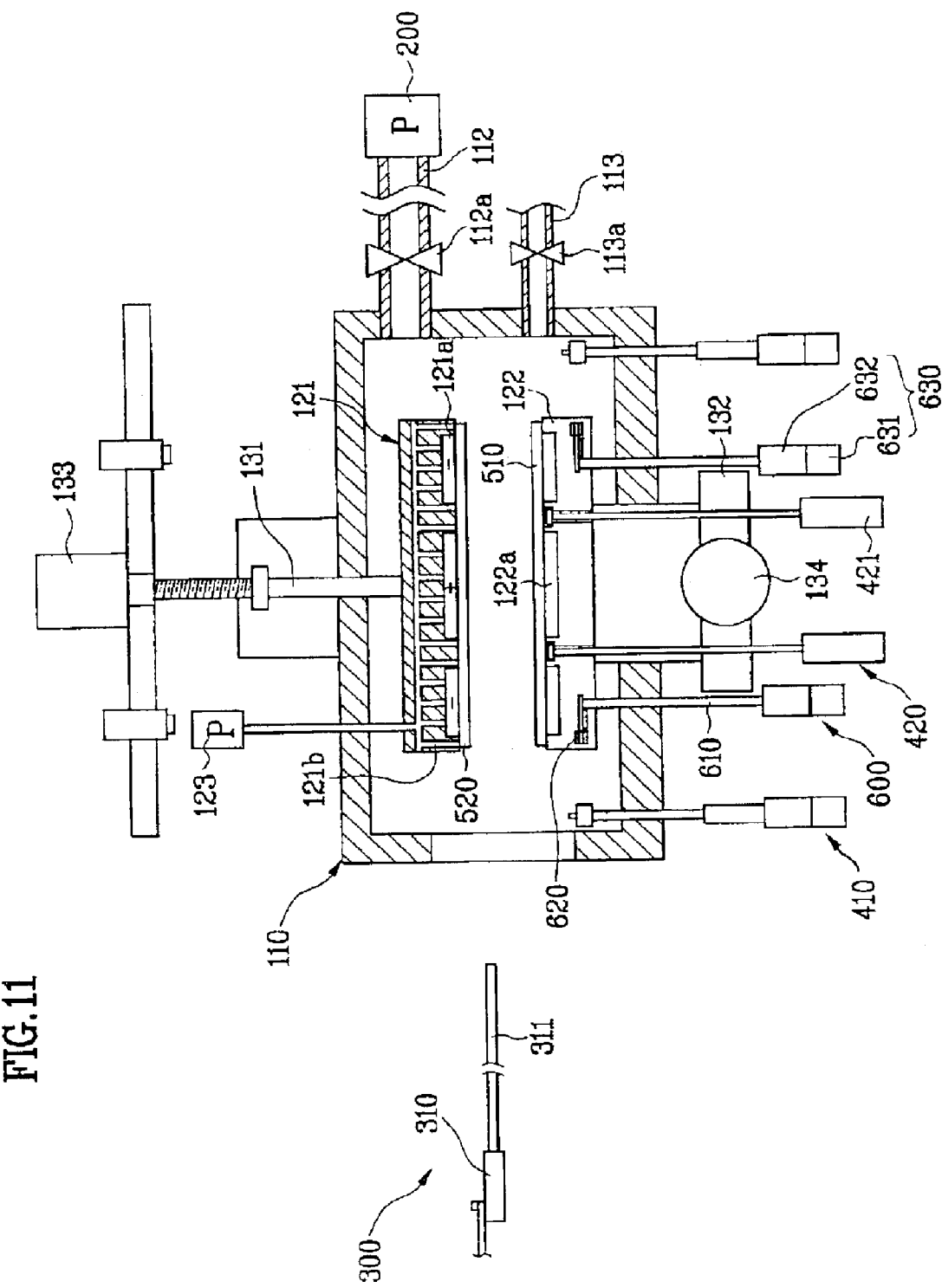

According to this, as the first substrate 510 is placed on a top of the lower stage 122, and, in succession, adsorbed to the lower stage 122 by the vacuum adsorbing force transmitted through the vacuum holes 121b in the upper stage 121, loading of the first substrate 510 is finished (step 1S in FIG. 18). This state is shown in FIG. 11.

In the meantime, as shown, drooping of the finger parts 311 of the first arm 310 can be prevented during operation of the process supplementing means 600, by putting only two process supplementing means 600 at an opposite side of the opening (opposite part of the part the robot arm and the finger parts are coupled) into operation for preventing drooping of the ends of the finger parts 311 only, or, though not shown, all the process supplementing means are put into operation at the same time, for supporting both the one ends and ends of the finger parts.

When the process supplementing means 600 supports the finger parts 311 of the first arm 310, the supporting parts 620 are not necessarily required for supporting the finger parts 311. That is, as shown in FIG. 4, a supplementary supporting part 640 may be formed at a side of the supporting part 620 extended perpendicular to a length direction of the supporting part 620, for additionally supporting the finger parts 311.

The supplementary supporting part 640 is formed to extend perpendicular to a length direction of the supporting part 620 for smooth supporting of the finger parts 311 as the length direction of the supplementary supporting part 640 is directed to a width direction of the finger parts 311 when the supplementary supporting part 640 is rotated to a required process position. Moreover, since the supplementary supporting part 640 makes no contact with the substrate, and a contact part of Teflon or PEEK® on the top thereof is not separately required.

The process supplementing means 600 is not necessarily limited to support only the ends of the finger part 311 of the carrying device 300, but may be designed to support ends of the substrates 510 and 520 carried by the carrying device.

Figure 12:
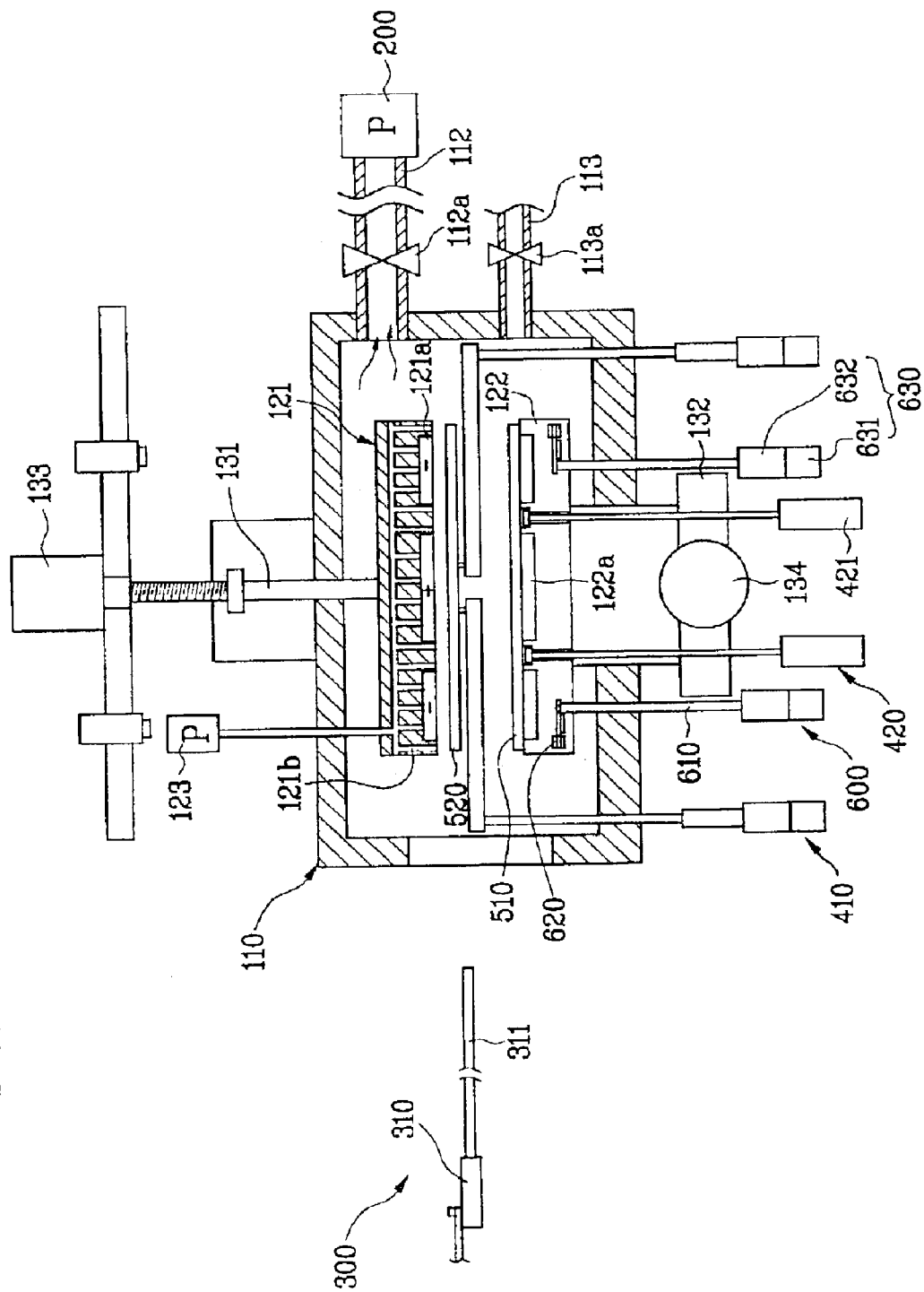
FIG. 12 illustrates a system showing an operation state of a bonding chamber in evacuation according to a method for fabricating an LCD in accordance with an embodiment of the present invention, schematically.
Figure 13:
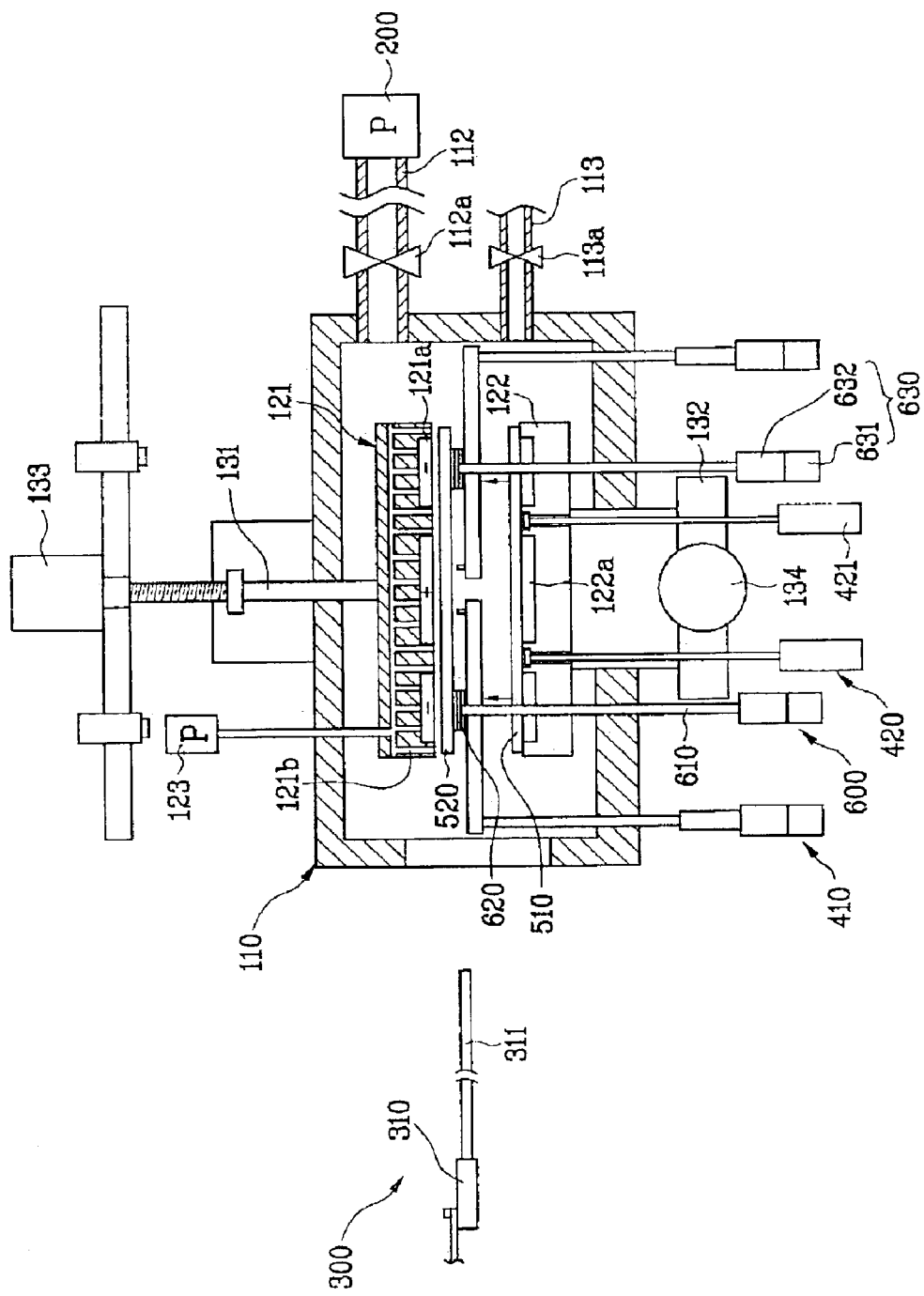
FIGS. 13 and 14 illustrate systems each showing an operation state of an upper stage electro-static adsorbing a second substrate according to a method for fabricating an LCD in accordance with an embodiment of the present invention, schematically.
Figure 14:
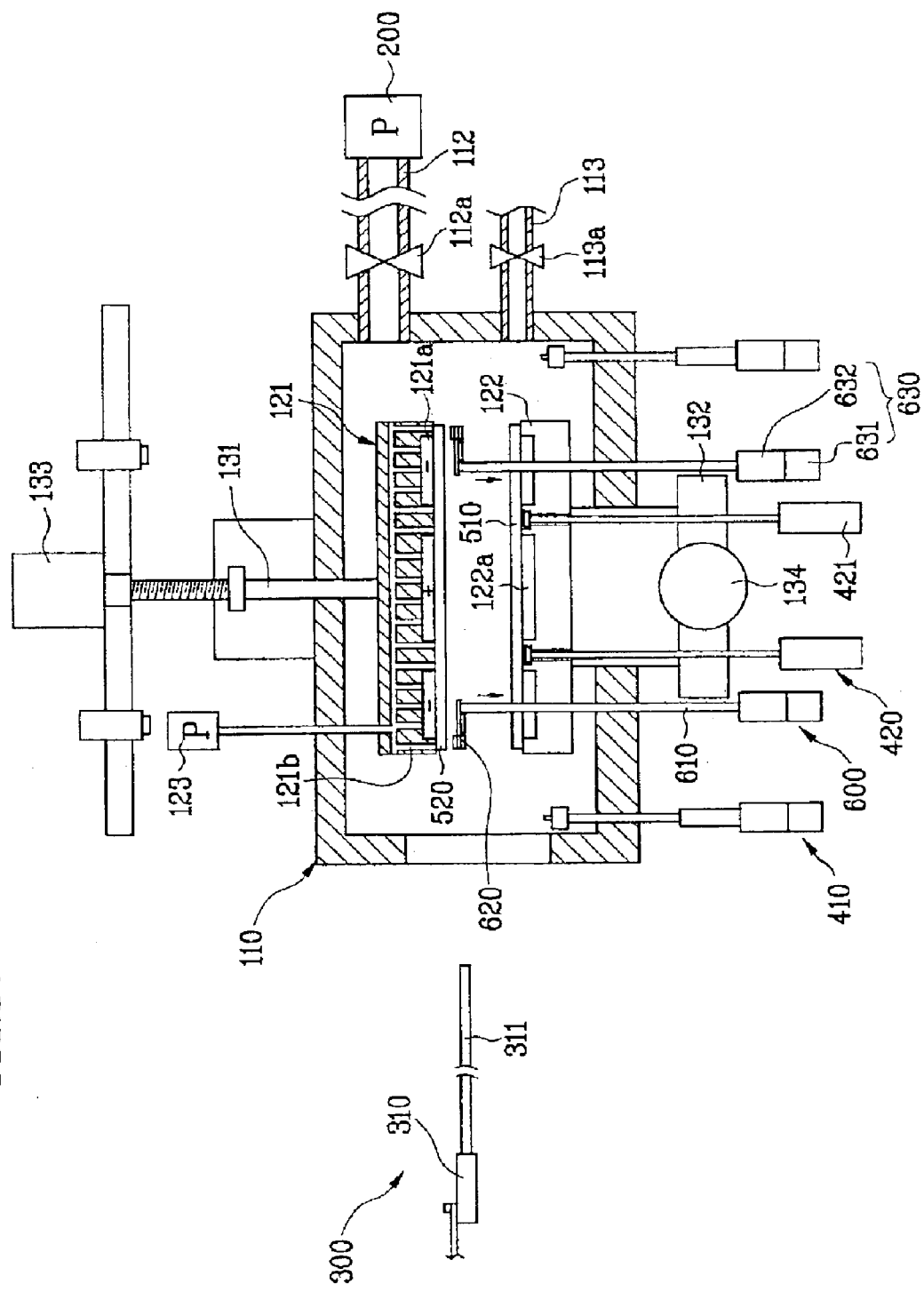

Then, the vacuum device 200 is put into operation for evacuation of the bonding chamber 110 (step 2S in FIG. 18). In this instance, the second substrate 520 is put on the supporting means 410 as shown in FIG. 12 because in the second substrate 520 vacuum adsorbed to the upper stage 121 drops if the bonding chamber 110 is evacuated.

That is, after the supporting means 410 is moved upward close to the second substrate, either the second substrate 520 is put on the supporting means 410, or the upper stage 121 having the second substrate adsorbed thereto and the supporting means 410 are brought at a certain distance, to drop the second substrate 520 on the supporting means 410 by gravity during the evacuation of the bonding chamber.

Though varied with liquid crystal modes to be bonded, the vacuum of the bonding chamber 110 is in a range of about $1.0 \times 10^{-3}$ Pa–1 Pa in an in plane switching (IPS) mode, and approximately in a range of about $1.1 \times 10^{-3}$ Pa–$10^2$ Pa in a twisted nematic (TN) mode.

When the bonding chamber 110 reaches to a certain degree of vacuum, the upper and lower stages 121 and 122 hold the first and second substrates 510 and 520 respectively by an electro static cleaner (ESC). In this instance, the process supplementing means 600 presses the second substrate 520 upward when the second substrate 520 is electrostatically adsorbed to the upper stage 121 in a state where the vacuum chamber 110 is at a vacuum, for smooth attachment of the second substrate 520 to the upper stage 121 (see FIGS. 13 and 14). Then, the first supporting means 410 is returned to an original position.

The upper stage 121 is moved downward so that the second substrate 520 comes close to the first substrate 510, and the first substrate 510 and the second substrate 520 are aligned (step 3S in FIG. 18).

After the two substrates are bonded, either an ultraviolet (UV) beam is directed, or heat or a pressure is partly applied the sealant between the first and second substrates 510 and 520, for setting the sealant to fix the first and second substrates 510 and 520 (step 5S in FIG. 18). The fixing of the bonded first and second substrates is carried out for prevention of misalignment of the bonded two substrates, or maintaining a bonded state during progressing to the next process after bonding, or transporting the bonded substrates, because the large size (1000 mm×1200) of the substrate and bonding of the two substrates after dropping liquid crystal are likely to cause the misalignment of the substrates during progression of the next process, or transporting the bonded substrates. Of course, the fixing process may be omitted.

Figure 15:
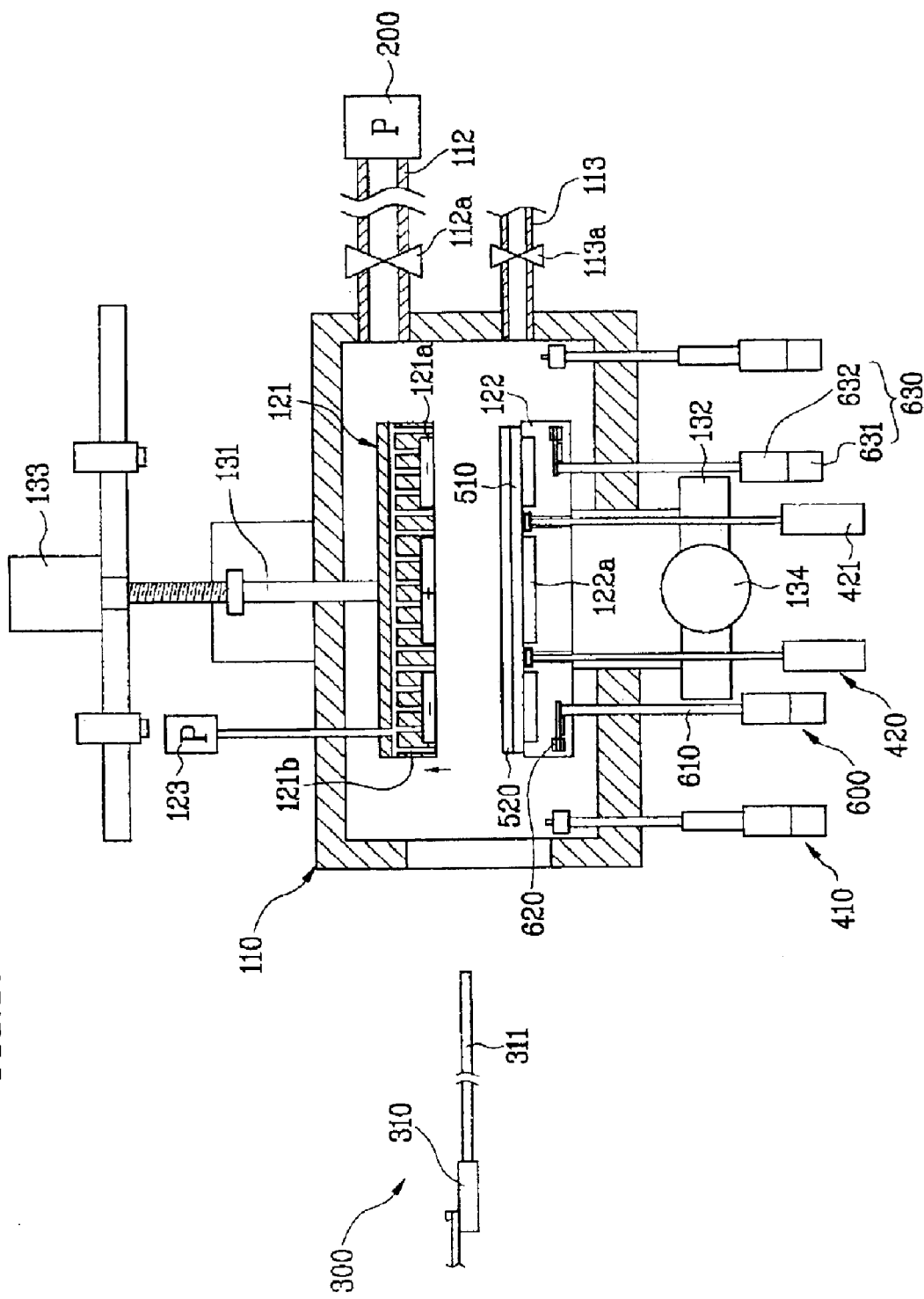
FIG. 15 illustrates a system showing a state of bonding according to a method for fabricating an LCD in accordance with an embodiment of the present invention, schematically.

Referring to FIG. 15, when the fixing of the two substrates is finished, after ESC is off, the upper stage 121 is moved upward to separate the upper stage from the bonded two glass substrates 510 and 520.

Figure 16:
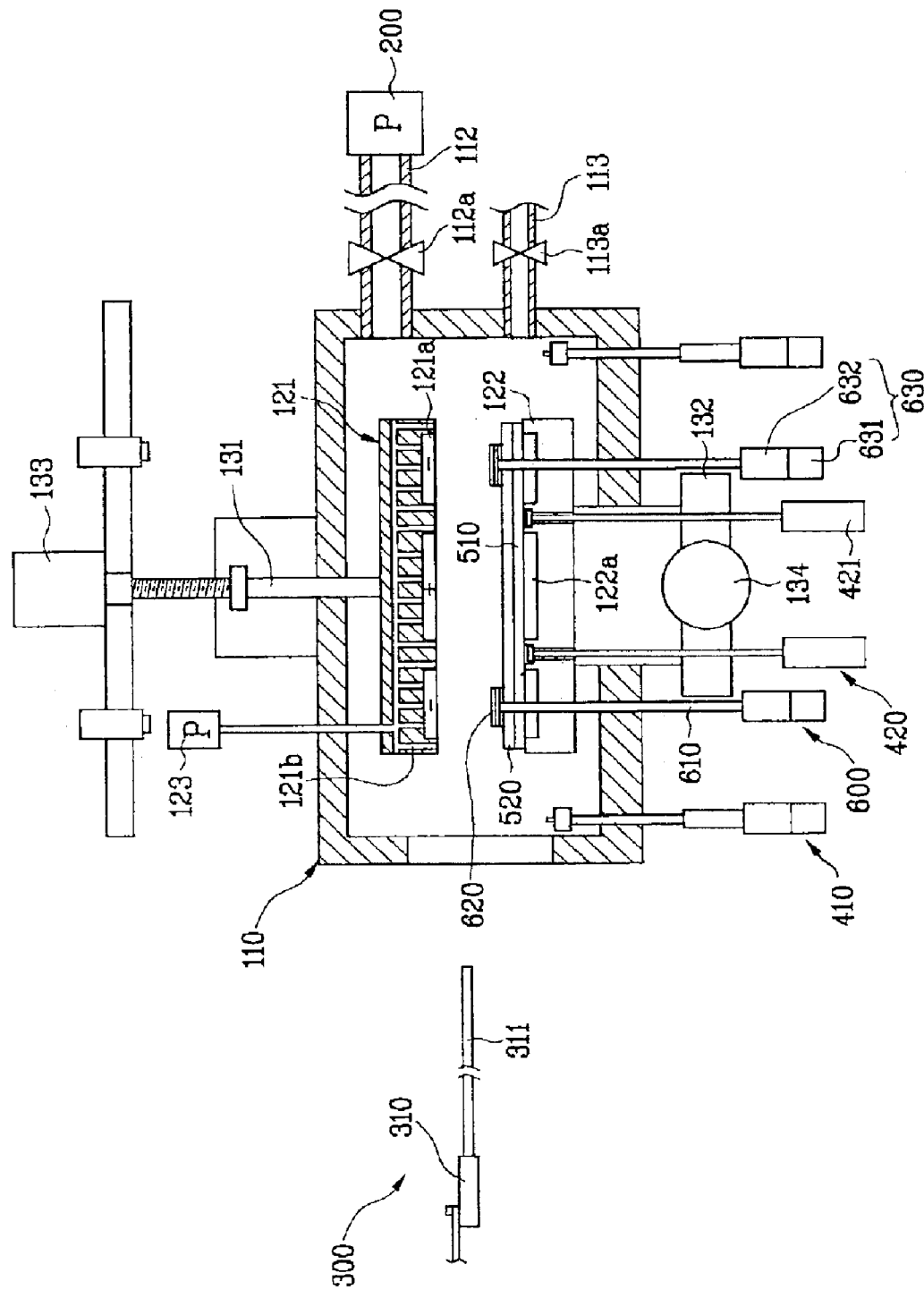
FIG. 16 illustrates a system showing an operation state in which substrates bonded by using a process supplementing means is fixed to a lower stage according to a method for fabricating an LCD in accordance with an embodiment of the present invention, schematically.

Referring to FIG. 16, the bonded substrates 500 are held at the lower stage 122 by using the process supplementing means 600. That is, as the elevating cylinder 632 of the driving part 630 in the process supplementing means 600 is driven to move the rotating shaft 610 upward, and the rotating motor 631 is driven, to rotate the rotating shaft 610, the supporting part 620 is brought to a working location. In this instance, the rotating shaft 610 is moved upward higher than a top of the bonded substrates 500 by approximately a preset height.

Under the above state, the elevating cylinders 632 in the process supplementing means 600 are driven continuously, to move the rotating shafts 610 downward, until the supporting parts 620 supports the bonded substrates 500. Accordingly, misalignment, or distortion of the bonded substrates can be prevented in the next step of venting.

Figure 17:
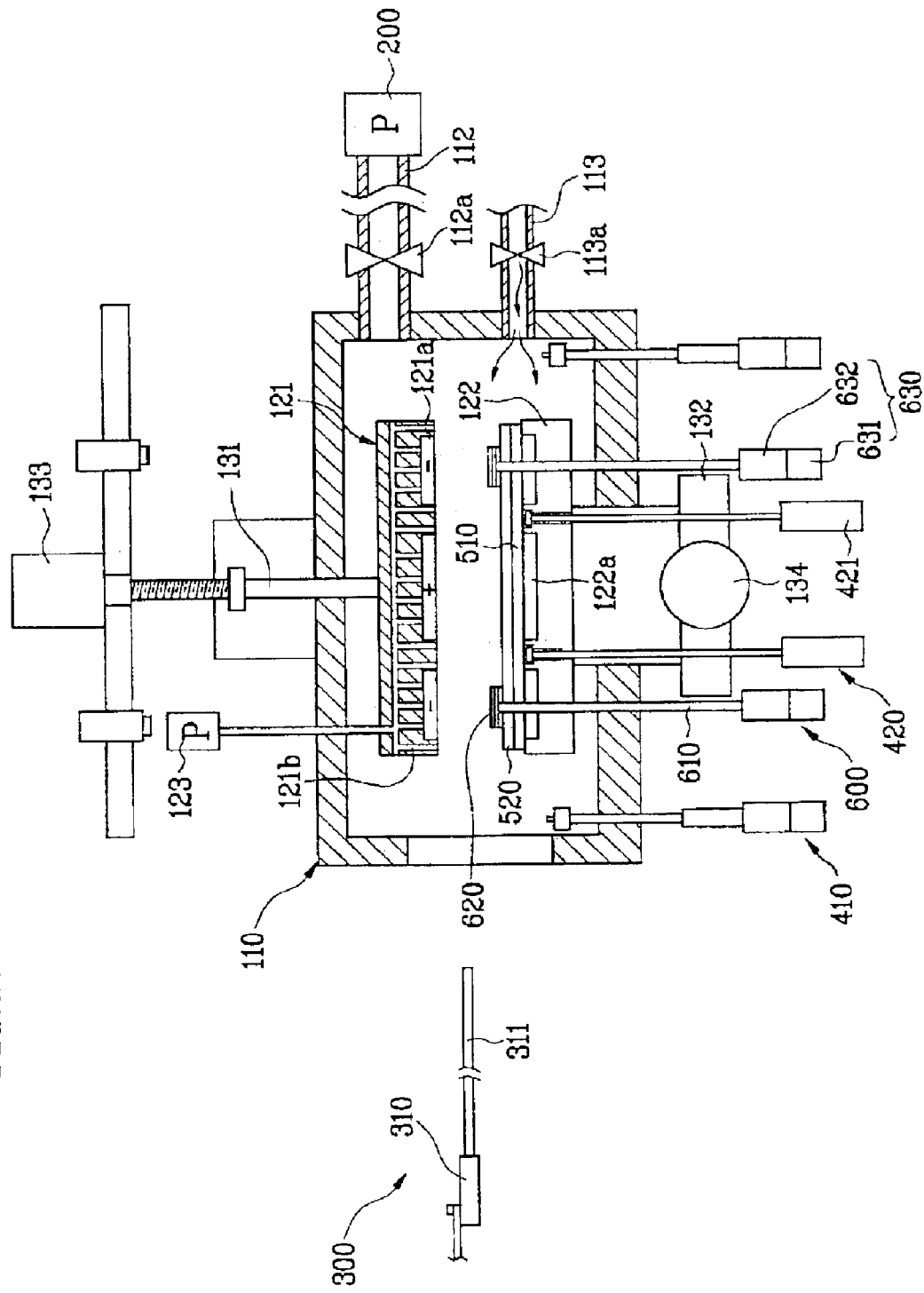
FIG. 17 illustrates a system showing an operation state in which a bonding chamber is vented according to a method for fabricating an LCD in accordance with an embodiment of the present invention, schematically.
Figure 18:
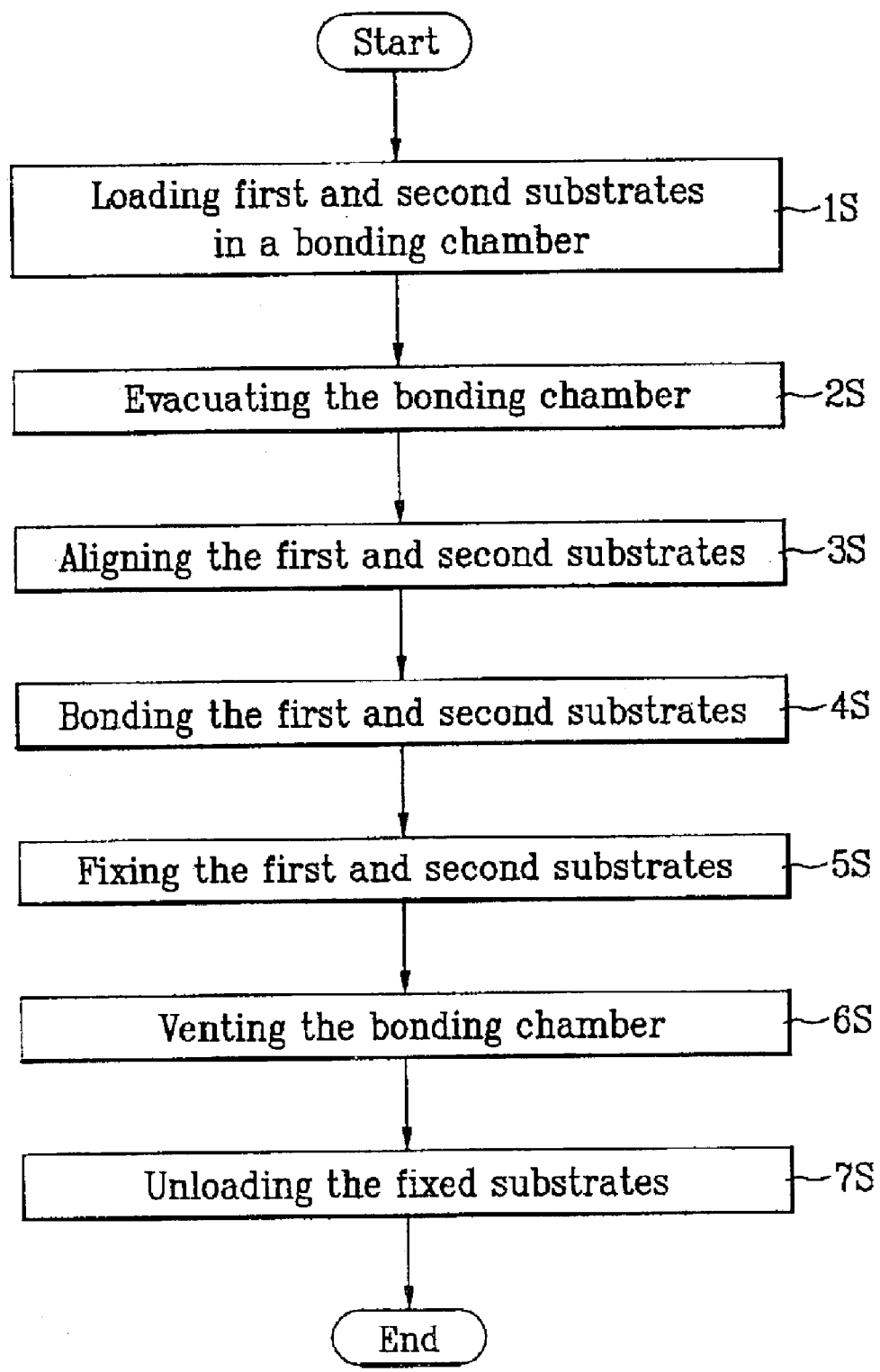
FIG. 18 illustrates the steps of a method for fabricating an LCD in accordance with an embodiment of the present invention, schematically.

Referring to FIG. 17, the valve 113a on the venting tube 113 is opened, for venting the chamber 110 by introducing air, or a gas (for an example, $N_2$ gas, or the like) into the vacuum chamber 110 through the opened line of the vent tube 113 (step 6S in FIG. 18).

When the bonding chamber 110 is vented, since a space between the bonded substrates bonded by the sealant is at a vacuum and the bonding chamber 110 is under an atmospheric pressure, the first and second substrates 510 and 520 are pressed together under a uniform pressure so as to maintain a uniform gap. The bonded substrates 510 and 520 are not only pressed by the atmospheric pressure, but also by a pressure of the $N_2$ or dry air introduced thereto in venting.

Moreover, since the substrate can be shaken and the bonded substrates may misalign if the chamber is vented rapidly, the venting is started slowly at first, to cause no shaking of the substrate, and the venting is made at a higher rate different from the first venting when a certain time period is reached, for quickly reaching to the atmospheric pressure.

Then, the pressed substrates are unloaded (step 7S in FIG. 18). That is, upon finishing the pressure application, the driving parts of the first and second lifting means 420 and 421 are driven, for moving the elevating shafts and the supporting parts upward, for separating the bonded substrates laid on the lower stage 122 from the lower stage 122, and continuing to move upward until the bonded substrates are in a space over the lower stage 122. Then, the loader part 300 is controlled to bring the second arm 320 loaded the second substrate 520 into the bonding chamber 110 again. The second arm 320 is brought into a location below the bonded substrate moved upward by the first and second lifting means 420 and 421.

In this state, the driving parts of the first and second lifting means 420 and 421 are driven, to move the elevating shafts and the supporting parts downward, placing the bonded substrates disposed on top of the supporting parts on the second arm 320, and to move the supporting parts downward further until the supporting parts are placed in the recess part in the lower stage 122.

Then, under the control of the loader part 300, the second arm 320 is brought out of the bonding chamber 110, thereby finishing unloading of the bonded substrates.

Of course, upon finishing unloading of the bonded substrates, loading of the first substrate 510 is carried out by the arm 310, and the first and second lifting means 420 and 421.

As has been explained, the bonding machine, and the method for fabricating an LCD by using the same of the present invention have the following advantages.

First, the loading/unloading of substrates to be bonded into/from the bonding chamber by using the carrying device shortens the loading/unloading time period and improves a productivity compared to the related art fabrication method in which the substrates are loaded/unloaded by the lower chamber unit.

Second, since the process supplementing means lifts the second substrate in a process where the second substrate is electro-statically adsorbed to the upper stage, the second substrate can be electro-statically adsorbed to the upper stage more easily. Particularly, this effect provides an advantage in terms of control in that the upper stage is not required to come closer to a location where the second substrate is to be disposed as much as possible in an adsorption process (or, evacuating the chamber).

Third, the supporting of a central part of the second substrate by the supporting means solves the problem of the substrate bending and falling off the supporting means even if the substrate has a large size.

Fourth, the fixing of the bonded substrate to the lower stage by using the process supplementing device prevents distortion between bonded substrates caused by rapid pressure change in a process releasing the vacuum of the bonding chamber after the bonding is finished.

Fifth, since the process supplementing means can support ends of the finger parts of an arm in the carrying device in loading the substrate, drooping of the finger parts can be prevented, which permits more stable substrate loading.

It will be apparent to those skilled in the art that various modifications and variations can be made in the bonding machine, and the method for fabricating an LCD by using the same of the present invention without departing from the spirit or scope of the invention. Thus, it is intended that the present invention cover the modifications and variations of this invention provided they come within the scope of the appended claims and their equivalents.

What is claimed is:

1. A method for fabricating an LCD by using a bonding machine having an upper stage and a lower stage provided in a bonding chamber to face each other, for adsorbing the first and second substrates carried in the bonding chamber, and bonding the substrates together, supporting means in the bonding chamber for receiving the second substrate, lifting means for lifting the substrate when the first substrate is loaded on the lower stage, and the bonded first and second substrates are unloaded from the lower stage, and process supplementing means fitted in the bonding chamber so as to be rotatable and movable up/down, for one of holding the bonded substrates and supporting the substrate to be held at the upper stage, the method comprising:

loading the first and second substrates on respective stages;

driving the supporting means to support the second substrate loaded on the upper stage, and evacuating the bonding chamber;

adsorbing the second substrate using the upper stage and bonding the first and second substrates together; and lifting the bonded first and second substrates from the lower stage by using the lifting means, and unloading the first and second substrates.

2. A method as claimed in claim 1, wherein loading includes:

carrying the second substrate into the bonding chamber by using a carrying device, and adsorbing the second substrate to the upper stage, and carrying the first substrate into the bonding chamber by using the carrying device, supporting the first substrate on the lifting means, and adsorbing the first substrate to the lower stage.

3. A method as claimed in claim 2, wherein supporting the first substrate on the lifting means includes:

supporting the first substrate on second lifting means at first and subsequently supporting the second substrate on first lifting means, the lifting means including first lifting means at the lower stage for supporting a central part of the substrate, and second lifting means at opposite edges of a top of the lower stage for supporting a periphery of the substrate.

4. A method as claimed in claim 2, further comprising supporting one side of the carrying device using a driving process supplementing means.

5. A method as claimed in claim 4, wherein supporting one side of the carrying device using the driving process supplementing means includes:

driving the driving part for moving the supporting parts to a location of the carrying device, and rotating the supporting parts so that the carrying device can be supported on the supporting part, the process supplementing means including a rotating shaft fitted so as to be rotatable and movable up/down, a supporting part formed as one unit with the rotating shaft at one end thereof for one of being brought into contact with a part of the substrate and the carrying device, and a driving part fitted to the other end of the rotating shaft.

6. A method as claimed in claim 1, further comprising venting the bonding chamber for applying a pressure to the bonded substrates after adsorbing the second substrate using the upper stage.

7. A method as claimed in claim 6, wherein venting includes:

holding the bonded substrates at the lower stage by using the process supplementing means, and venting the bonding chamber to an atmospheric state.

8. A method as claimed in claim 7, wherein holding the bonded substrates at the lower stage by using the process supplementing means includes:

driving the driving part to move the supporting part to a location of the bonded substrates, rotating the supporting part so that the carrying part is supported thereon, and moving the supporting part down for holding the bonded substrates at the lower stage, the process supplementing means including a rotating shaft fitted to be rotatable and movable up/down, a supporting part formed as one unit with the rotating shaft at one end thereof for being brought into contact with a part of the substrate or the carrying device, and a driving part fitted to the other end of the rotating shaft.

9. A method as claimed in claim 1, further comprising fixing the bonded substrates after adsorbing the second substrate using the upper stage.

10. A method as claimed in claim 1, wherein loading the first and second substrates includes adsorbing the substrates by vacuum.

11. A method as claimed in claim 1, further comprising adsorbing the upper stage electro-statically, and moving the second substrate supported on the supporting means upward after driving the supporting means.

12. A method as claimed in claim 11, wherein adsorbing the upper stage electro-statically using the second substrate includes driving the process supplementing means for pressing the second substrate on the supporting means toward the upper stage.

13. A method as claimed in claim 1, further comprising loading the substrate to be bonded before lifting the bonded first and second substrates.

14. A method as claimed in claim 1, further comprising setting a sealant to fix the first and second substrates together after bonding the first and second substrates.

15. A method as claimed in claim 1, further comprising moving the upper stage upward to separate the upper stage from the bonded first and second substrates.

16. A method as claimed in claim 13, further comprising unloading the pressed substrates by driving the first and second lifting means for separating the bonded substrates.

* * * * *